United States Patent
Hofmann et al.

(10) Patent No.: US 8,738,064 B2
(45) Date of Patent: May 27, 2014

(54) METHOD AND ARRANGEMENT FOR POWER CONTROL

(75) Inventors: Juergen Hofmann, Merching (DE); Josef Kolbinger, Ergoldsbach (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1398 days.

(21) Appl. No.: 12/312,072

(22) PCT Filed: Oct. 22, 2007
(Under 37 CFR 1.47)

(86) PCT No.: PCT/EP2007/061272
§ 371 (c)(1),
(2), (4) Date: Jul. 7, 2010

(87) PCT Pub. No.: WO2008/049803
PCT Pub. Date: May 2, 2008

(65) Prior Publication Data
US 2010/0311460 A1 Dec. 9, 2010

(30) Foreign Application Priority Data
Oct. 25, 2006 (DE) .......................... 10 2006 050 354

(51) Int. Cl.
*H04B 7/00* (2006.01)

(52) U.S. Cl.
USPC .................................. 455/522; 342/82; 701/3

(58) Field of Classification Search
USPC .......................................................... 455/522
See application file for complete search history.

(56) References Cited

U.S. PATENT DOCUMENTS

| | | | | |
|---|---|---|---|---|
| 4,512,588 A * | 4/1985 | Cox | .............................. | 280/5.26 |
| 5,047,779 A * | 9/1991 | Hager | ........................... | 342/120 |
| 5,067,172 A | 11/1991 | Schloemer | | |
| 5,160,933 A * | 11/1992 | Hager | ........................... | 342/174 |
| 5,898,401 A * | 4/1999 | Walls | ............................. | 342/82 |
| 5,936,571 A * | 8/1999 | Desjardins | .............. | 342/357.59 |
| 6,108,539 A * | 8/2000 | Ray et al. | ...................... | 455/430 |
| 6,167,263 A * | 12/2000 | Campbell | ..................... | 455/431 |
| 6,342,836 B2 * | 1/2002 | Zimmerman | ................. | 340/571 |
| 6,408,180 B1 * | 6/2002 | McKenna et al. | ............. | 455/431 |
| 6,483,453 B2 * | 11/2002 | Oey et al. | ......................... | 342/29 |
| 6,507,739 B1 * | 1/2003 | Gross et al. | .................. | 455/431 |
| 6,531,978 B2 * | 3/2003 | Tran | ............................... | 342/29 |
| 6,646,588 B2 * | 11/2003 | Tran | ............................... | 342/29 |
| 6,685,140 B2 * | 2/2004 | Carroll | ......................... | 244/139 |
| 6,788,935 B1 * | 9/2004 | McKenna et al. | ............. | 455/431 |
| 6,963,795 B2 * | 11/2005 | Haissig et al. | .................... | 701/7 |
| 6,992,614 B1 * | 1/2006 | Joyce | ............................ | 342/122 |

(Continued)

FOREIGN PATENT DOCUMENTS

| | | |
|---|---|---|
| WO | 2004/112418 A1 | 12/2004 |
| WO | 2006/075126 A1 | 7/2006 |
| WO | 2007/022418 A2 | 2/2007 |

OTHER PUBLICATIONS

International Search Report for PCT/EP2007/061272; mailed Feb. 15, 2008.

*Primary Examiner* — Hai V Nguyen
(74) *Attorney, Agent, or Firm* — Staas & Halsey LLP

(57) ABSTRACT

In radio communication between a central unit in an airborne vehicle and a radio communication terminal, the central unit controls a setting of transmission power depending on the altitude of the airborne vehicle during climbing and descending flight using hysteresis.

15 Claims, 1 Drawing Sheet

(56) References Cited

U.S. PATENT DOCUMENTS

| | | | |
|---|---|---|---|
| 7,148,840 B2 * | 12/2006 | Dooi et al. | 342/131 |
| 7,158,073 B2 * | 1/2007 | Ybarra | 342/29 |
| 7,205,939 B2 * | 4/2007 | Zimmerman | 342/464 |
| 7,259,713 B1 * | 8/2007 | Matich et al. | 342/145 |
| 7,271,766 B2 * | 9/2007 | Zimmerman et al. | 342/464 |
| 7,315,278 B1 * | 1/2008 | Bauregger et al. | 342/357.27 |
| 7,339,524 B2 * | 3/2008 | Zimmerman et al. | 342/458 |
| 7,339,525 B2 * | 3/2008 | Zimmerman et al. | 342/464 |
| 7,541,970 B1 * | 6/2009 | Godfrey et al. | 342/173 |
| 7,567,779 B2 * | 7/2009 | Seligsohn et al. | 455/12.1 |
| 7,620,364 B2 * | 11/2009 | Higashida et al. | 455/11.1 |
| 7,640,016 B2 * | 12/2009 | Cruz et al. | 455/431 |
| 7,957,851 B2 * | 6/2011 | Braswell et al. | 701/3 |
| 8,392,007 B1 * | 3/2013 | Izo et al. | 700/94 |
| 2001/0052850 A1 * | 12/2001 | Zimmerman | 340/572.1 |
| 2002/0019229 A1 * | 2/2002 | Usher et al. | 455/435 |
| 2002/0142658 A1 * | 10/2002 | Koide et al. | 439/610 |
| 2003/0040273 A1 * | 2/2003 | Seligsohn et al. | 455/12.1 |
| 2003/0122701 A1 * | 7/2003 | Tran | 342/29 |
| 2004/0142658 A1 | 7/2004 | McKenna et al. | |
| 2005/0231418 A1 * | 10/2005 | Ybarra | 342/29 |
| 2006/0063529 A1 * | 3/2006 | Seligsohn et al. | 455/431 |
| 2007/0042772 A1 * | 2/2007 | Salkini et al. | 455/431 |
| 2007/0213009 A1 * | 9/2007 | Higashida et al. | 455/62 |
| 2010/0234071 A1 * | 9/2010 | Shabtay et al. | 455/562.1 |

* cited by examiner

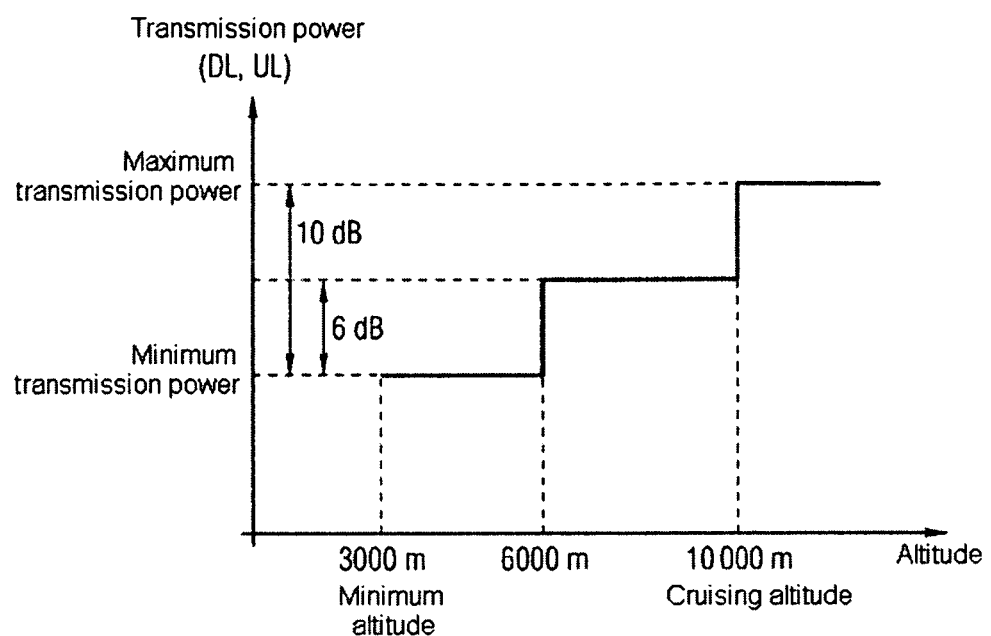

METHOD AND ARRANGEMENT FOR POWER CONTROL

CROSS REFERENCE TO RELATED APPLICATIONS

This application is the U.S. national stage of International Application No. PCT/EP2007/061272, filed Oct. 22, 2007 and claims the benefit thereof. The International Application claims the benefit of German Patent Application No. 10 2006 050 354.6 filed on Oct. 25, 2006, both applications are incorporated by reference herein in their entirety.

BACKGROUND

Described below are a method and system for power control for radio communication within a device which can fly.

Spatial areas are known in which it is undesirable for private subscribers to use radio communication terminals or mobile radio communication terminals, or in which the use of radio communication terminals must be regulated.

By way of example, these spatial areas include sensitive areas in hospitals in which it would be possible for radio wave propagation and selected transmission powers when carrying out radio communication to influence equipment functions which are important to life.

This likewise includes aircraft interiors, in which it would be possible for radio communication taking place onboard to have a disturbing influence on the navigation electronics.

By way of example, aircraft are subject to specific requirements relating to the transmission powers of radio communication terminals that are used in the aircraft interior, in order to produce a connection with a central point onboard the aircraft itself. The central point then produces a connection between the radio communication terminal of a subscriber and the outside world via the aircraft radio system.

The aircraft central point may, for example, be in the form of a base station of a radio communication system, in order to allow the subscriber to use his own, private or business-use radio communication terminal in the aircraft.

Since an aircraft base station in this case uses standardized radio transmission resources and radio transmission methods, interference from terrestrial radio communication systems during overflight must be avoided. This interference is measurable in particular at altitudes below 3000 meters.

A further problem results from the fact that a radio communication terminal can set up a radio link to a terrestrial radio network at an altitude of less than 3000 meters, for example, without having to use the base station or central point onboard the aircraft itself. In this case the radio communication terminal will transmit at a very high or at the maximum transmission power level in order to cover the distance to the terrestrial base station, thus possibly resulting in interference with aircraft equipment in particular during take-off or landing.

US 2002/0019229 A1 discloses a base station and all the mobile stations which are connected to the base station in the aircraft being switched off during a landing approach and during take-off. The transmission power is therefore reduced to zero. The landing approach and take-off are detected by means of the remaining flight time, the low altitude, extension of the landing flaps or ground contact of the wheels.

US 2001/0052850 A1 discloses a radio link with a transmitter in order to locate baggage. The transmitter can be switched off during landing and take-off processes. A landing or take-off process is determined by the air pressure in the cargo bay of the aircraft, vibration or acceleration of the aircraft.

WO 2006/075126 A1 discloses a base station simulator which first of all sends a signal to the radio communication terminal in order to set up a link to the base station simulator. In a second step, the base station simulator sends a signal which renders the radio communication terminal inactive.

US 2004/0142658 A1 discloses a transparent system which sends the system identifications of the terrestrial radio systems to the radio communication terminals and therefore either switches them to an inactive state or to a state with a low transmission power.

WO 2007/022418 A2 discloses a method for switching the communication of the base station in the aircraft to the radio communication terminals on or off.

In order to avoid problems such as these, the operation of a radio communication terminal in the interior of an aircraft is envisaged only above a minimum altitude.

In addition, it is necessary to limit the transmission power of the radio communication terminals located in the aircraft interior and of the base station onboard the aircraft itself, in order on the one hand to allow radio links between the radio communication terminals in the aircraft interior and a central point or base station which is provided for this purpose onboard the aircraft itself, and in order on the other hand to prevent or to minimize interference from terrestrial radio communication networks.

On the other hand, it is advantageous to increase the transmission powers of the radio communication terminals and the aircraft base station in the aircraft interior, in order to ensure more robust voice or data transmission, or to increase the transmission rate for data services.

SUMMARY

A method and system for power control for radio communication in the interior of a device which can fly, are described below by which radio links are possible with a central point provided for this purpose, while avoiding or reducing interference, and which ensures the greatest possible robustness of radio communication and as high a data transmission rate as possible.

In this case of power control for radio communication within a device which can fly, the radio communication takes place between a central unit in the device which can fly and a radio communication terminal. In this case, a setting of the transmission power for radio communication is controlled by the central unit. Accordingly, the transmission power is set as a function of the altitude of the device which can fly.

In one advantageous development, further terrain information, for example geographic characteristics, morphology and population density, as well as the knowledge of positions of terrestrial radio communication base stations and of terrestrial stations are used in order to determine a maximum transmission power or a current transmission power of the radio communication terminal and/or of the central unit in the interior of the device which can fly.

BRIEF DESCRIPTION OF THE DRAWINGS

These and other aspects and advantages will become more apparent and more readily appreciated from the following description of the exemplary embodiments, taken in conjunction with the accompanying drawing of:

FIG. 1 shows an altitude, which is referred to as an "altitude above ground" on a horizontal axis.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

The transmission power "Transmit Power" is plotted on a vertical axis for a link, which is referred to as an uplink UL, from a radio communication terminal MS to a central unit BTS, and a transmission power "Transmit Power" for a link, which is referred to as the downlink DL, from the central unit BTS to the radio communication terminal MS.

The central unit BTS is in this case in the form of a base station, while the radio communication terminal MS is in the form of a mobile subscriber terminal.

By way of example and without any restriction, an aircraft is referred to as "a device which can fly" in the following text.

At a first altitude, in this case a minimal altitude, for example of 3000 m, a minimal transmission power of 0 dBm is set and used onboard the aircraft, as the "device which can fly", for radio communication between the central unit BTS and the radio communication terminal MS. This first transmission power is referred to as the "Minimum TX Power" and is maintained at the altitude which is referred to as the "minimum altitude".

Above a second altitude of, for example, 6000 m, the transmission power is increased in steps by 6 dB in comparison to the abovementioned "Minimum TX Power" onboard the aircraft, and is maintained up to an altitude of 10 000 m. This second transmission power is referred to as the "Intermediate TX Power" and is maintained while at the altitude which is referred to as the "Intermediate altitude".

Above a third altitude of, for example, 10 000 m, the transmission power is increased in steps by 10 dB in comparison to the "Minimum TX Power" onboard the aircraft, and is maintained up to a maximum altitude. This third transmission power is referred to as the "Maximum TX Power" and is maintained while the aircraft is at the cruising altitude.

In order to limit any interference effect on devices in the aircraft which are not resistant to interference, an upper limit can also be defined on an aircraft-specific basis for the transmission powers, which must not be exceeded.

The power regulation as described above is carried out in the same sense in the opposite direction while the aircraft is descending, so that the transmission power is once again reduced in steps from 10 dB (at altitudes of more than 10 000 m) to zero dBm at the altitude of 3000 m.

The power control can advantageously be carried out as a function of the altitude in the form of a hysteresis curve. The step-by-step increase or decrease in the transmission power is then not carried out in the cruising altitude range on the basis of absolute altitudes, but using predetermined intervals.

For example, the step-by-step increase by 10 dB in comparison to the "Minimum TX Power" at an altitude of 10 100 m is carried out in climbing flight, in order, during subsequent descending flight, to carry out a step-by-step decrease to 6 dB in comparison to the "Minimum TX Power" at an altitude of 10 000 m. This effectively counteracts any instability of the power control in the event of slight fluctuations in the altitude.

In a further advantageous refinement, a network monitoring unit is installed in the aircraft and produces a noise level in the reception band of the radio communication terminals in the aircraft interior during operation of the aircraft base station. This prevents reception of broadcast transmission channels, designated as broadcast channels, of terrestrial communication networks.

The noise level can now also advantageously be set as a function of the altitude and therefore as a function of the distance of the aircraft from the terrestrial base stations. For example, when the altitude is increasing, the noise level is reduced in the same manner as that in which the transmission power described above is increased.

This has a positive effect on the signal-to-noise ratios of radio communication links in the aircraft interior, thus enhancing their robustness and increasing the data transmission rate.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for transmission power control for radio communication between a central unit and a radio communication terminal, within a device which can fly, comprising:
controlling, by the central unit during climbing flight and descending flight, a setting of transmission power for the radio communication as a function of an altitude of the device using hysteresis, the transmission power being varied in steps.

2. The method as claimed in claim 1, wherein said setting sets the transmission power additionally as a function of characteristics of an overflown environment.

3. The method as claimed in claim 2, wherein geographic characteristics of at least one of the overflown environment and population density of the overflown environment are used as environmental characteristics.

4. The method as claimed in claim 2, wherein geographic positions of terrestrial stations, in particular of terrestrial radio communication bas stations, are used as environmental characteristics.

5. The method as claimed in claim 1, wherein said setting sets at least one of a first transmission power for radio communication from the central unit to the radio communication terminal, and a second transmission power for radio communication from the radio communication terminal to the central unit.

6. The method as claimed in claim 5, wherein a base station of a radio communication system is used as the central unit.

7. The method as claimed in claim 6, further comprising preventing, by a network monitoring unit connected to the central unit and with use of a noise power that is set as a function of the altitude, reception of terrestrial broadcast transmission channels where radio communication terminals are located inside the device which can fly.

8. The method as claimed in claim 7, further comprising setting the noise power additionally as a function of the characteristics of the overflown environment.

9. The method as claimed in claim 8, further comprising reducing the noise power of the network monitoring unit continually in steps above a minimum altitude, as the altitude increases.

10. A system for transmission power control of radio communication between a central unit and at least one radio communication terminal within a device which can fly, comprising:

a central unit engaging in radio communication with the at least one radio communication terminal including a controller setting a transmission power to carry out the radio communication; and a first setting means for varying transmission power in steps, during climbing and descending flight using hysteresis, as a function of altitude of the device which can fly.

11. The system as claimed in claim 10, wherein said central unit further includes a second setting means for setting the transmission power based on characteristics of an overflown environment.

12. The system as claimed in claim 11, wherein the second setting means varies the transmission power in steps.

13. The system as claimed in claim 12, wherein the central unit is a base station.

14. The system as claimed in claim 13, further comprising a network monitoring unit, connected to the central unit, supplied with information relating to at least one of the altitude and the overflown environment.

15. The system as claimed in claim 14, wherein the network monitoring unit sets a noise power in a reception band of the radio communication terminals, or the central unit determines the noise power and transmits the noise power to the network monitoring unit to set the noise power.

* * * * *

UNITED STATES PATENT AND TRADEMARK OFFICE
CERTIFICATE OF CORRECTION

PATENT NO.        : 8,738,064 B2
APPLICATION NO.   : 12/312072
DATED             : May 27, 2014
INVENTOR(S)       : Hofmann et al.

Page 1 of 1

It is certified that error appears in the above-identified patent and that said Letters Patent is hereby corrected as shown below:

On the Title Page Item [54], and in the Specification, Column 1, Line 1, Title, delete
"ARRANGEMENT" and insert -- SYSTEM --, therefor.

In the Claims

Column 4, Line 34, in Claim 1, delete "terminal," and insert -- terminal --, therefor.
Column 4, Line 35, in Claim 1, delete "unit" and insert -- unit, --, therefor.
Column 4, Line 49, in Claim 4, delete "bas" and insert -- base --, therefor.

Signed and Sealed this
Twelfth Day of August, 2014

Michelle K. Lee
*Deputy Director of the United States Patent and Trademark Office*